US006299839B1

(12) United States Patent
Karunaratne et al.

(10) Patent No.: US 6,299,839 B1
(45) Date of Patent: Oct. 9, 2001

(54) SYSTEM AND METHODS FOR PERFORMING ROTOR ASSAYS

(75) Inventors: Arjuna R. Karunaratne, Fremont; Stoughton L. Ellsworth, Palo Alto; Lawrence M. Ensler, Los Altos; Eric K. Gustafson, Palo Alto, all of CA (US)

(73) Assignee: First Medical, Inc., Mountain View, CA (US)

( * ) Notice: Subject to any disclaimer, the term of this patent is extended or adjusted under 35 U.S.C. 154(b) by 0 days.

(21) Appl. No.: 08/522,434

(22) Filed: Aug. 31, 1995

(51) Int. Cl.[7] .............................. G01N 35/04; G01N 1/28; G01N 1/00; B01F 13/08

(52) U.S. Cl. .............................. 422/63; 422/58; 422/64; 422/72; 422/102; 435/287.1; 435/287.2; 435/287.3; 435/287.4; 435/287.5; 435/7.21; 436/45; 436/52; 436/164; 436/172; 436/514; 436/518; 436/526; 436/809

(58) Field of Search .............................. 422/58, 63, 64, 422/72, 102; 435/287.1, 287.2, 287.3, 288.4, 288.5, 7.21, 7.94; 436/45, 164, 172, 514, 518, 807, 809, 52, 526; 210/205, 222, 782, 789, 745, 514, 359, 380.1, 198.1, 94

(56) References Cited

U.S. PATENT DOCUMENTS 3,772,154 * 11/1973 Isenberg et al. .................. 195/103.5
3,864,089 2/1975 Tiffany et al. ...................... 23/258.5

(List continued on next page.)

FOREIGN PATENT DOCUMENTS 0 288 179 10/1988 (EP) .
0 467 782 1/1992 (EP) .

OTHER PUBLICATIONS

"FluoroLink™ Cy5™ Reactive Dye 5–Pack, Cat. No. A2400," (1995) Biological Detection Systems, Inc., Product Brochure.

DeBelder, A. N. et al. "Preparation and properties of fluorescein–labelled dextrans," (1973) *Carbohydrate Research,* 30:375–378.

Glabe, C. G. et al. "Preparation and Porperties of Fluorescent Polysaccharides," (1983) *Analytical Biochemistry* 130:287–294.

Southwick, P. L. et al. "Cyanine dye labeling Reagents–Carboxymethylindocyanine Succinimidyl Esters[1]," (1990) *Cytometry* 11:418–430.

Mujumdar, R. B. et al. "Cyanine Dye Labeling REagents: Sulfoindocyanine Succinimidyl Esters," (1993) *Bioconjugate Chem.* 4:105–111.

* cited by examiner

*Primary Examiner*—Long V. Le
*Assistant Examiner*—Gailene R. Gabel
(74) *Attorney, Agent, or Firm*—Townsend and Townsend and Crew LLP

(57) ABSTRACT

An analytical system comprises a frame and movable carriage. An analytical rotor is mounted on the carriage and can be translated among a sample dispensing station, a fluid dispensing station, and a label detection zone. In order to perform assays, the analyzer system requires only the introduction of the analytical rotor, sample, and a volume of diluent solution. Sample within the analyzer is contained at all times within either a sample receptacle or the rotor. The method allows for the sequential addition of sample and diluent in order to perform multiple assay steps and is particularly suitable for performing heterogeneous immunoassays. The use of fluorescent label in the system allows multiple analyte detection reactions to be performed from a single sample applied to a single rotor.

34 Claims, 12 Drawing Sheets

U.S. PATENT DOCUMENTS

| | | | | |
|---|---|---|---|---|
| 3,873,217 | | 3/1975 | Anderson et al. | 356/246 |
| 3,899,296 | | 8/1975 | Mailen et al. | 23/259 |
| 3,901,658 | | 8/1975 | Burtis et al. | 23/259 |
| 3,994,687 | * | 11/1976 | Engelbrecht | 23/230 |
| 4,225,558 | | 9/1980 | Peterson et al. | 422/72 |
| 4,279,862 | | 7/1981 | Bretaudiere et al. | 422/72 |
| 4,284,602 | | 8/1981 | Kelton et al. | 422/72 |
| 4,314,968 | | 2/1982 | Guigan | 422/64 |
| 4,353,982 | | 10/1982 | Gomez et al. | 435/7 |
| 4,515,889 | * | 5/1985 | Klose et al. | 435/4 |
| 4,624,961 | | 11/1986 | Welstead, Jr. | 514/403 |
| 4,673,653 | | 6/1987 | Guigan | 436/8 |
| 4,728,500 | * | 3/1988 | Higo | 422/99 |
| 4,740,472 | | 4/1988 | Burtis et al. | 436/63 |
| 4,788,154 | | 11/1988 | Guigan | 436/180 |
| 4,810,639 | | 3/1989 | Pankratz | 435/7 |
| 4,876,203 | | 10/1989 | Guigan | 436/45 |
| 4,894,204 | | 1/1990 | Cornut | 422/72 |
| 4,900,662 | | 2/1990 | Shah et al. | 435/7 |
| 4,912,033 | | 3/1990 | Ladenson et al. | 435/7 |
| 4,938,927 | | 7/1990 | Kelton et al. | 422/64 |
| 5,009,996 | | 4/1991 | Shah et al. | 435/7 |
| 5,009,997 | | 4/1991 | Shah et al. | 435/7.4 |
| 5,173,193 | * | 12/1992 | Schembri | 210/782 |
| 5,186,844 | | 2/1993 | Burd et al. | 210/782 |
| 5,202,234 | | 4/1993 | Shah et al. | 435/7.4 |
| 5,242,606 | | 9/1993 | Braynin et al. | 210/787 |
| 5,258,041 | | 11/1993 | Guire et al. | 623/66 |
| 5,268,486 | | 12/1993 | Waggoner et al. | 548/427 |
| 5,272,092 | * | 12/1993 | Hamasaki et al. | 436/172 |
| 5,316,784 | | 5/1994 | Maurer et al. | 427/2 |
| 5,382,515 | | 1/1995 | Shah et al. | 435/7.4 |
| 5,382,522 | | 1/1995 | Shah et al. | 435/7.4 |
| 5,580,524 | * | 12/1996 | Forrest et al. | 422/63 |
| 5,693,292 | * | 12/1997 | Choperena et al. | 422/67 |
| 5,705,062 | * | 1/1998 | Knobel | 210/205 |

SYSTEM AND METHODS FOR PERFORMING ROTOR ASSAYS

The subject matter of the present application is related to that disclosed in each of the following U.S. patent applications which are being filed on the same day: Ser. No. 08/522,048, now abandoned, Ser. No. 08/521,860, now U.S. Pat. No. 5,650,334, Ser. No. 08/521,615, pending, and Ser. No. 08/522,435, now abandoned, the full disclosures of which are incorporated herein by reference.

BACKGROUND OF THE INVENTION

1. Field of the Invention

The present invention relates generally to apparatus and methods for detecting analytes in liquid samples. More particularly, the present invention relates to an analytical system and method for dispensing liquid samples and reagents into an analytical rotor, manipulating the rotor to perform a desired assay, and detecting assay results within the rotor.

Several automated analytical systems have been developed for the detection and measurement of biological and other analytes in liquid samples. While such systems can be classified in many ways, the present invention is particularly concerned with assays which use analytical rotors for performing some or all of the steps necessary for a desired testing protocol. Assay protocols which use rotors generally rely on introduction of a liquid sample to the rotor followed by spinning of the rotor to transfer the liquid sample and optionally other liquid reagents between various reaction and detection chambers in the rotor. Rotation and/or back and forth motion of the rotor often is also relied on to mix the liquid sample with diluents, other reagents, and the like. The use of analytical rotors is advantageous since they provide a self-contained platform for performing the desired analytical method. Moreover, the use of analytical rotors is often relied upon for separating cellular components from whole blood to produce plasma suitable for testing.

Heretofore, analytical rotors have been most widely used for performing enzymatic and other non-immunological testing procedures. Such non-immunological test protocols often do not require multiple, sequential reaction steps where different reagent solutions will be passed successively past a solid phase surface where the immunological reaction (s) occur. That is, most enzymatic tests can be run in a single chamber or cuvette by providing appropriate lyophilized or other dried reagents within the chamber. It is then only necessary to introduce a desired volume of plasma or other liquid sample, where a resulting enzymatic reaction produces a detectable color signal. Thus, most instruments for handling rotors do not require substantial liquid handling and other capabilities for performing multiple, sequential addition of sample and reagent(s) to a reaction chamber within the rotor.

For these reasons, it would be desirable to provide an improved system and methods for the manipulation and handling of analytical rotors to perform immunological assays. In particular, it would be desirable to provide instruments which are able to position the rotor successively at different locations and/or orientations to receive sample and other liquid reagent(s) in a preselected order and amount. The instrument and method should preferably be able to transfer the rotor between different operative locations within the instrument, while at all times retaining the ability to spin the rotor at desired rotational speed(s) in order to effect fluid transfer within the rotor in a manner consistent with the test protocol. The instrument should have the ability to receive fresh containers of diluent and optionally other liquid reagents and to further dispense such liquids to the rotor at appropriate points within a test protocol. The instrument should further include the ability to dispense liquid sample to the rotor, preferably having the ability to separate and dispense plasma from a whole blood sample supplied to the instrument in the self-contained receptacle. Furthermore, the instrument should have an integral signal detector capable of reading signal directly from the rotor, such as a fluorescent signal which is produced by exposing the rotor to an appropriate excitation source. The system and method of the present invention will meet at least some of the above objectives.

2. Description of the Background Art

U.S. Pat. No. 4,314,968, describes an analytical rotor intended for performing immunoassays. Analytical rotors intended for separating cellular components from whole blood samples and distributing plasma to one or more peripheral cuvettes are described in U.S. Pat. Nos. 3,864,089; 3,899,296; 3,901,658; 4,740,472; 4,788,154; 5,186,844; and 5,242,606. Analytical rotors intended for receiving sample liquids and transferring the samples radially outward by rotation of the rotor, usually with dilution of the sample, are described in U.S. Pat. Nos. 3,873,217; 4,225,558; 4,279,862; 4,284,602; 4,876,203; and 4,894,204.

SUMMARY OF THE INVENTION

According to the present invention, a system for performing assays which use analytical rotors comprises a frame defining longitudinal, transverse, and vertical axes. A rotational drive unit is disposed on or within the frame and removably receives and selectively rotates the rotor. A positioning assembly on the frame is provided for translating the rotational drive unit along a predetermined path within the analyzer, usually in a linear direction along the longitudinal axis of the frame. A liquid reagent dispenser is disposed along the predetermined path so that the rotational drive unit may be moved to position a rotor held thereon to receive liquid reagent from the dispenser. A sample dispensing unit is also disposed along the predetermined path and adapted to receive a disposable sample receptacle. The sample dispensing unit further includes a drive mechanism for dispensing liquid sample from the receptacle to a rotor held on the drive unit. A signal detector will also be disposed along the predetermined path and, in an exemplary embodiment, will comprise a fluorescent excitation source and fluorescence detector capable of detecting a fluorescent label within a reaction chamber on the rotor. The system will further include a controller operatively connected to each of the rotational drive units, positioning assembly, liquid reagent dispenser, sample dispensing unit, and detector so that automated analytical protocols may be carried out.

The present invention further provides a method for detecting an analyte using an analyzer. The method comprises removably placing a rotor having a plurality of interconnecting internal chambers into the analyzer. A sample receptacle is also removably placed into the analyzer, and the rotor positioned in a first position relative to the sample receptacle. The sample is then dispensed from the receptacle into an internal chamber within the rotor while the rotor remains in its first position. The rotor is then spun to transfer sample to a reaction chamber within the rotor. The rotor is then positioned in a second position relative to a reagent dispenser within the analyzer. Reagent is then dispensed from the reagent dispenser into a chamber within the rotor while the rotor remains in its second position. The rotor is then spun to transfer reagent from the chamber to the reaction chamber. After a desired reaction has occurred, the rotor is positioned in a third position within the analyzer where a reaction within the reaction chamber is detected by a detector at said position. It will be appreciated, of course, that those steps are the minimum required by the method of the present invention and that actual protocols will usually include additional steps.

The analytical system and method of the present invention are particularly useful for performing multiple step assays, such as immunoassays, where a sample, diluent, and optionally other liquid reagent(s) are added at different times to a rotor during an assay protocol. The system and method of the present invention allow the rotor to be positioned and manipulated in at least one direction and preferably at least two orthogonal directions so that the rotor can be moved among various dispensing and detection stations within the analyzer. This is particularly advantageous as it simplifies the design of the analyzer since the sample dispensing, reagent dispensing, and detection units may be fixed or provided only with limited movement capability within the analyzer. The construction of the present analyzer further simplifies and improves long term alignment of the various components, and the analyzer is easily adapted to rotors having different geometries.

DESCRIPTION OF THE SPECIFIC EMBODIMENTS

The system and method of the present invention are intended to receive, manipulate, and perform test protocols on analytical rotors of the type which receive a test sample and initiate flow of the test sample and other reagent(s) through multiple sequential chambers by spinning of the rotor. The system and method will also provide for the initial transfer of test sample to the rotor and subsequent transfer of wash, diluent, and/or reagent solutions as necessary to perform the desired test protocol. The system and method of the present invention will be particularly useful for handling analytical rotors intended for performing immunological assays (immunoassays), such as heterogeneous immunoassays where analyte is captured from a test sample in a reaction chamber within the rotor and subsequently detected by specifically attaching a visible label, such as a fluorescent, chemiluminescent, bioluminescent, or other optically detectable labels. The present invention will also find use, however, in the performance of non-immunological assays, such as conventional enzymatic assays, as well as in the performance of immunological assays which employ other labels, such as radioactive labels, enzyme labels, and the like.

The method and system of the present invention function by receiving the rotor and subsequently positioning the rotor in a series of positions within an analyzer to sequentially receive sample, wash reagent, diluents, and/or other reagents needed for performing the desired test protocol. The sample and reagent stations are generally fixed within the analyzer (although they may include movable components), and the rotor will usually be translated relative to said stations, typically being moved in at least a first direction and a second direction (usually along longitudinal and vertical axes defined by a frame) among the stations. Such an arrangement is desirable since it allows the station assemblies to be fixed within the analyzer, simplifying its construction.

In a preferred aspect of the system, sample will be delivered to the analyzer in a substantially enclosed receptacle, and the analyzer will include a mechanism for dispensing sample from the receptacle to the rotor while the rotor is positioned at a dispensing station. Similarly, in another preferred aspect of the present invention, a wash or diluent solution will be provided in a replaceable reservoir within the analyzer. Conveniently, a single diluent/wash reagent may be the only liquid reagent delivered to the rotor, where active reagents will be reconstituted within the rotor upon provision of the liquid diluent/wash reagent.

Figure 1:
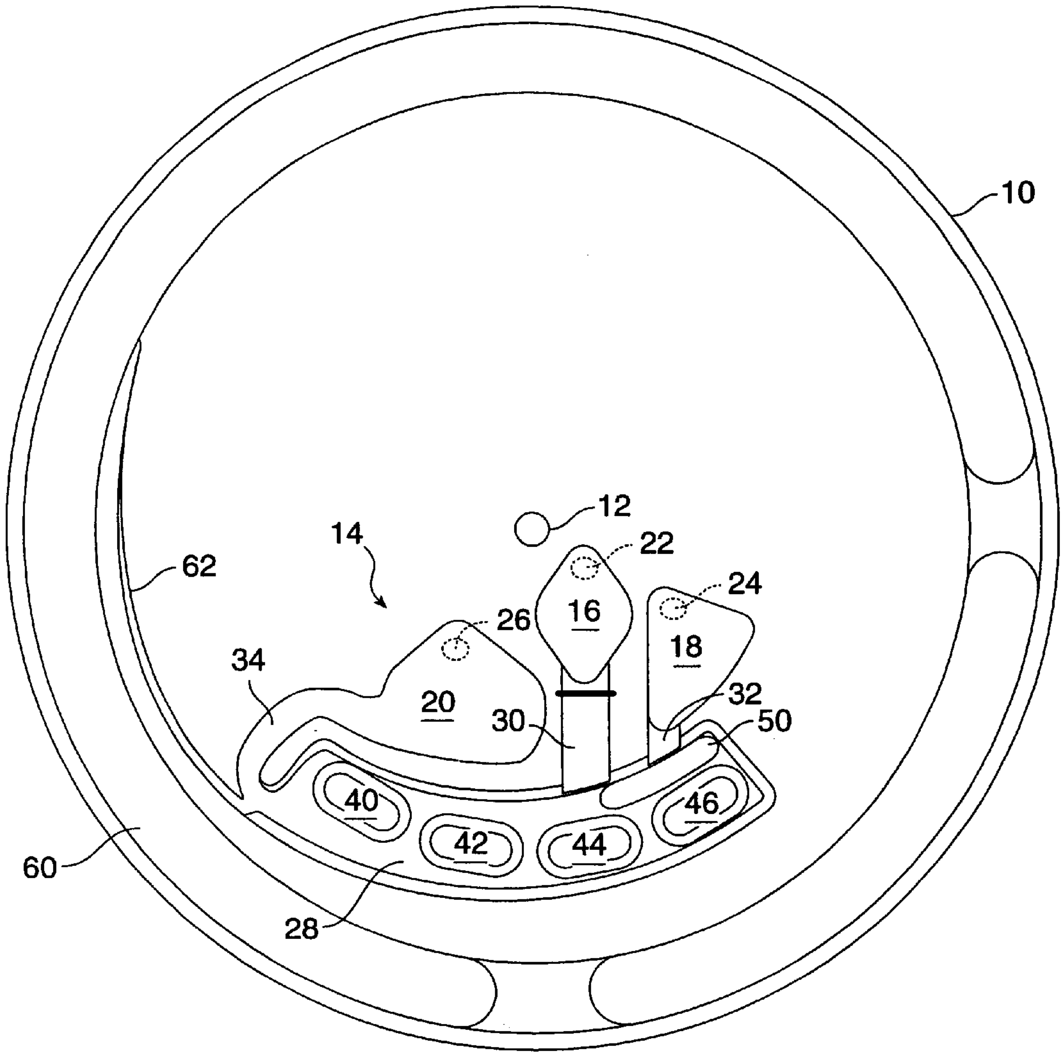
FIG. 1 is a top plan view of an analytical rotor which may be employed with the system and method of the present invention.

Referring now to FIG. 1, the construction of an exemplary analytical rotor 10 which may be used in the method and system of the present invention will be described. This rotor 10 is described in greater detail in copending application Ser. No. 08/521,860, the full disclosure of which has previously been incorporated herein by reference. The rotor 10 comprises a rotor body which is in the form of a thin disk typically having a diameter in the range from 4 cm to 8 cm, and a thickness in the range from 4 mm to 10 mm. The rotor body 10 includes a mounting structure 12 which defines an axis of rotation and which can be placed on a magnetic chuck or spindle 12 on a rotational drive motor. As illustrated, the rotor body 10 includes a single "test panel 14" which comprises a sample chamber 16, a wash chamber 18, and labelling reagent chamber 20. Each of the chambers 16, 18, and 20 will have an associated inlet port 22, 24, and 26, respectively, to permit introduction of the appropriate liquid during performance of an assay, as described in more detail below. Often, it will be desirable to include separate positive and negative control panels on the same rotor 10. For simplicity of illustration, such control panels are not shown on FIG. 1.

A reaction chamber 28 is connected to each of the chambers 16, 18, and 20, by connecting flow paths 30, 32, and 34, respectively. Each of the flow paths 30, 32, and 34 will have a "low" resistance to flow so that liquid will flow radially outward upon relatively slow rotation of the rotor (e.g. about 1000 rpm), but will provide a sufficient barrier so that liquids initially placed into chamber 16, 18, and 20, while the rotor is stationary, will not pass into the reaction chamber 28. The optional use of hydrophobic surfaces within the chambers and flow paths will further prevent such unintended flow. The preparation of hydrophobic surfaces (for providing enhanced binding of hydrophobic proteins, but which will also be effective to limit liquid flow) is described in detail in copending application Ser. No. 08/522,435, the full disclosure of which has previously been incorporated herein by reference.

Flow path 34 which connects the labelling reagent chamber 20 with the reaction chamber 28 is connected to the bottom (i.e., the radially outward-most point) of the reaction chamber 28. By connecting to this point of the reaction chamber 28, rather than the top (i.e., the radially inward-most point), labelling reagent will enter the chamber from the bottom and fill upwardly during the later transfer step. Such bottom delivery reduces the formation of bubbles in the reaction zone which could, in some instances, cause certain labelling reagents to foam and cause them to enter into other chambers. Such problem would be exacerbated by the possibility of trapping air bubbles within oval regions on the bottom of the chamber, which would further displace the labelling reagent and increase the risk of the reagent entering other inlet chambers or flowing back into the labelling reagent chamber 20. Moreover, by connecting flow path 34 adjacent to high resistance flow path 62, the labelling reagent will be most directly evacuated from the chamber 20 during the evacuation step, further reducing the risk of contaminating subsequent steps of the detection protocol with labelling reagent.

Reaction zones 40, 42, 44, and 46, will be formed within the reaction chamber 28. Usually, each of the reaction zones will be defined by immobilizing a desired specific binding substance on a geometrically defined region or pattern on a wall of the reaction chamber 28, as illustrated. (Details of methods for binding reagents are described in copending application Ser. No. 08/374,265, the full disclosure of which is incorporated herein by reference, and application Ser. No. 08/522,435, the full disclosure of which has previously been incorporated herein by reference. Alternatively, the reaction zone(s) could be formed by attaching beads, or other structures, within the reaction chamber 28. In a preferred aspect of the rotor, the individual reaction zones will be located within the reaction chamber so that a vapor collection region 50 is defined in a radially inward portion of the chamber 28. Conveniently, the vapor collection region 50 may be formed by moving a portion of the inner wall of the chamber 28 radially inward and/or forming recessed trap for collecting such vapors.

Figure 2:
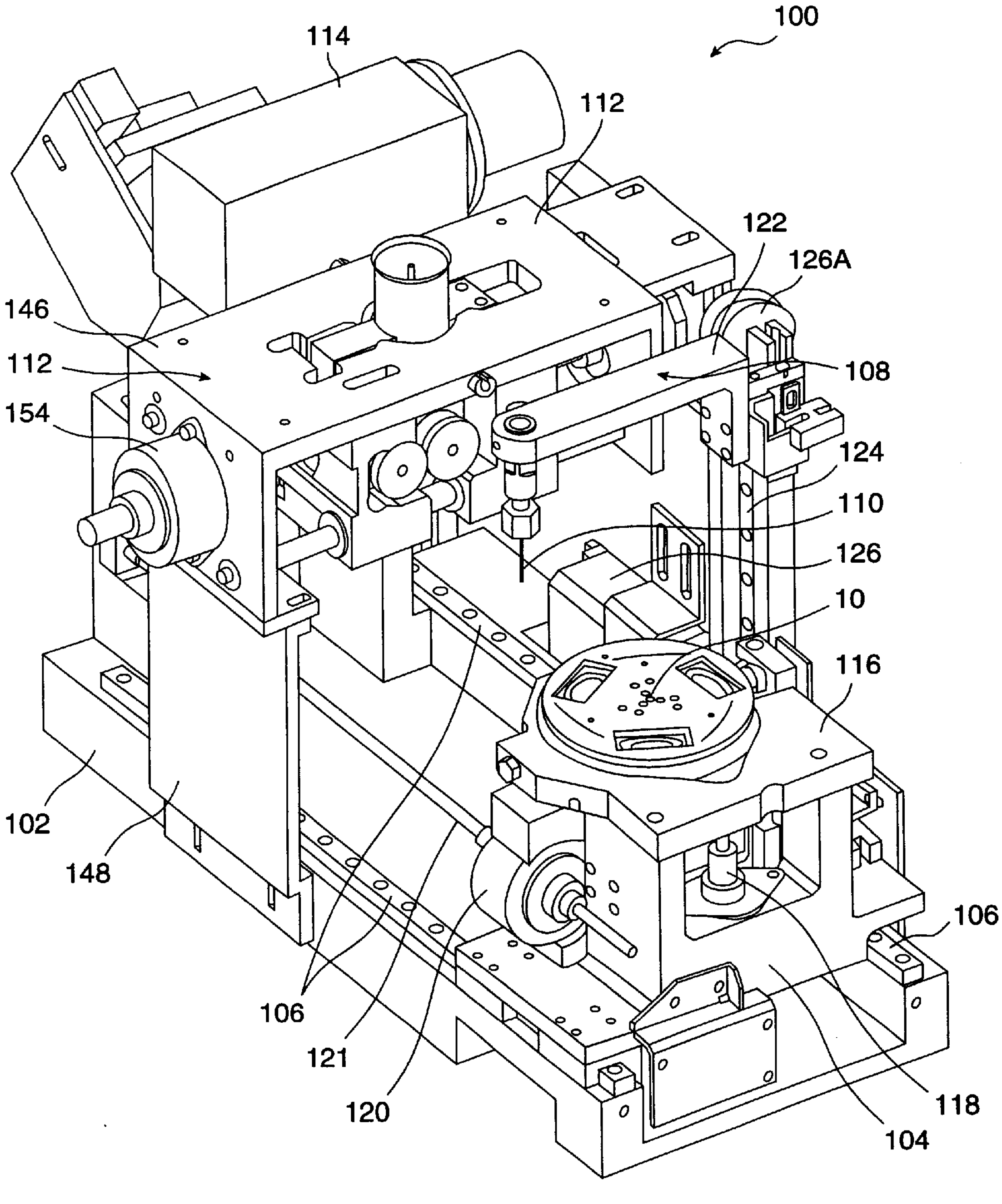
FIG. 2 is an isometric view of an analytical system constructed in accordance with the principles of the present invention.
Figure 3:
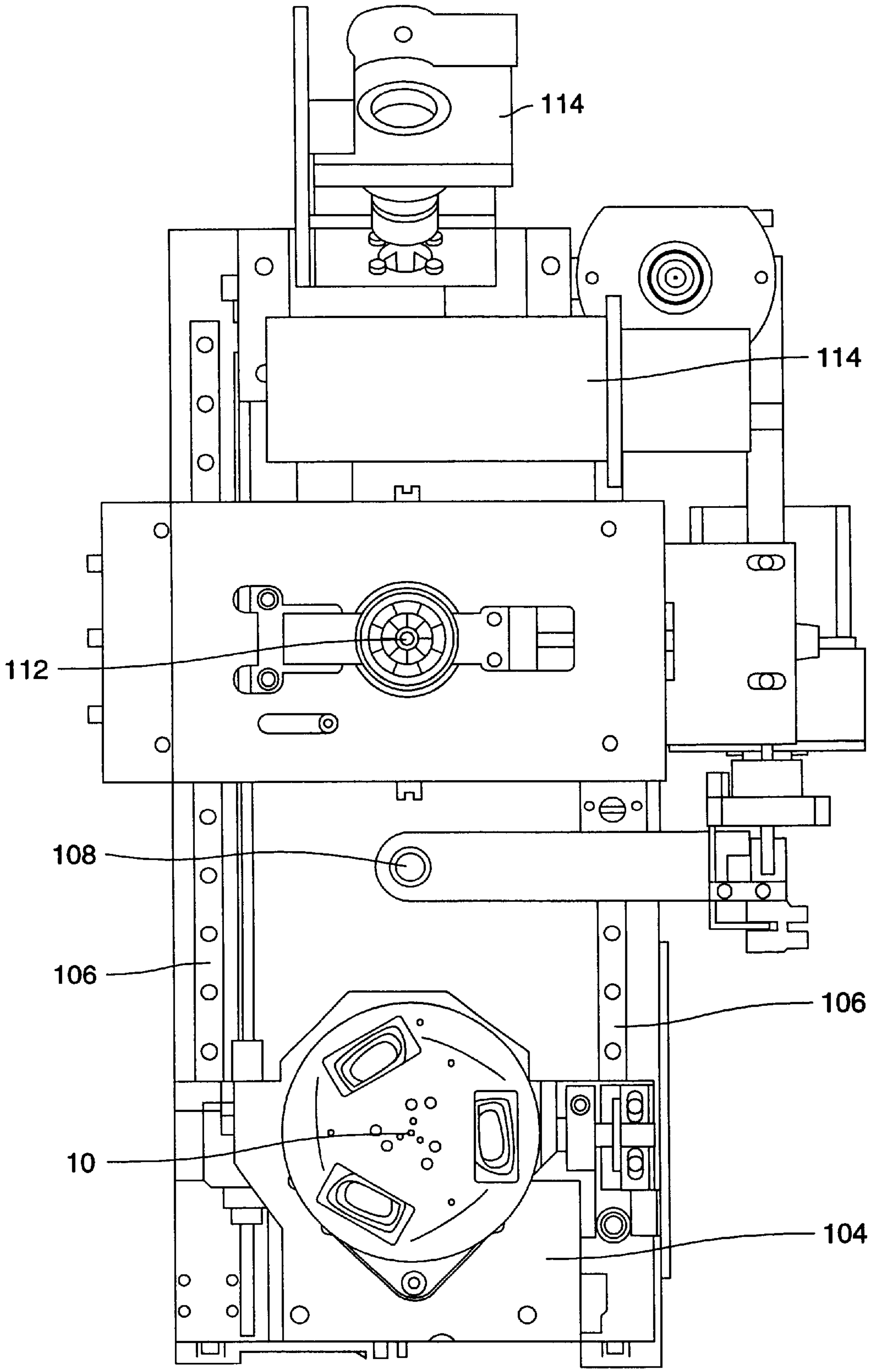
FIG. 3 is a top plan view of the analytical system of FIG. 1.
Figure 4:
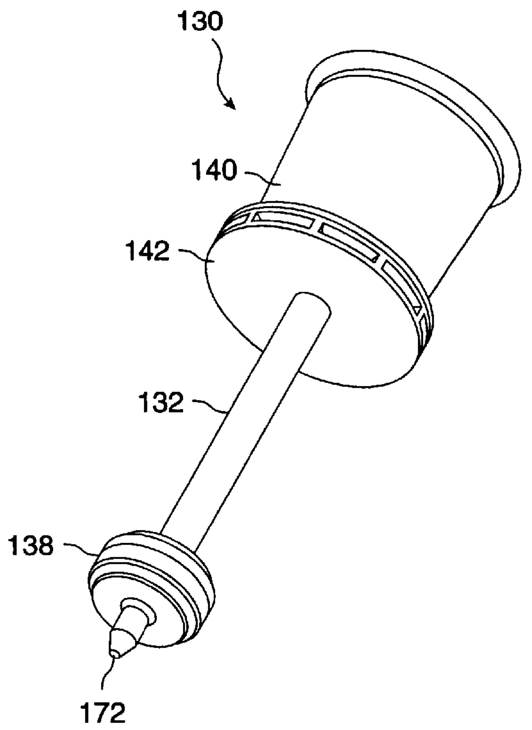
FIG. 4 illustrates an exemplary sample receptacle that may be utilized to dispense plasma to the analytical system of FIG. 1.
Figure 5:
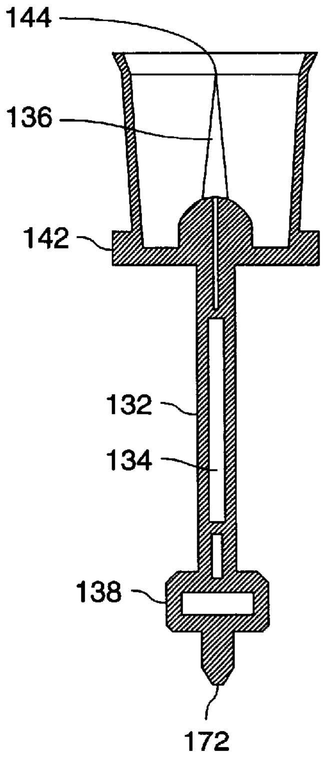
FIG. 5 is a side, cross-sectional view of the sample receptacle of FIG. 5.
Figure 6:
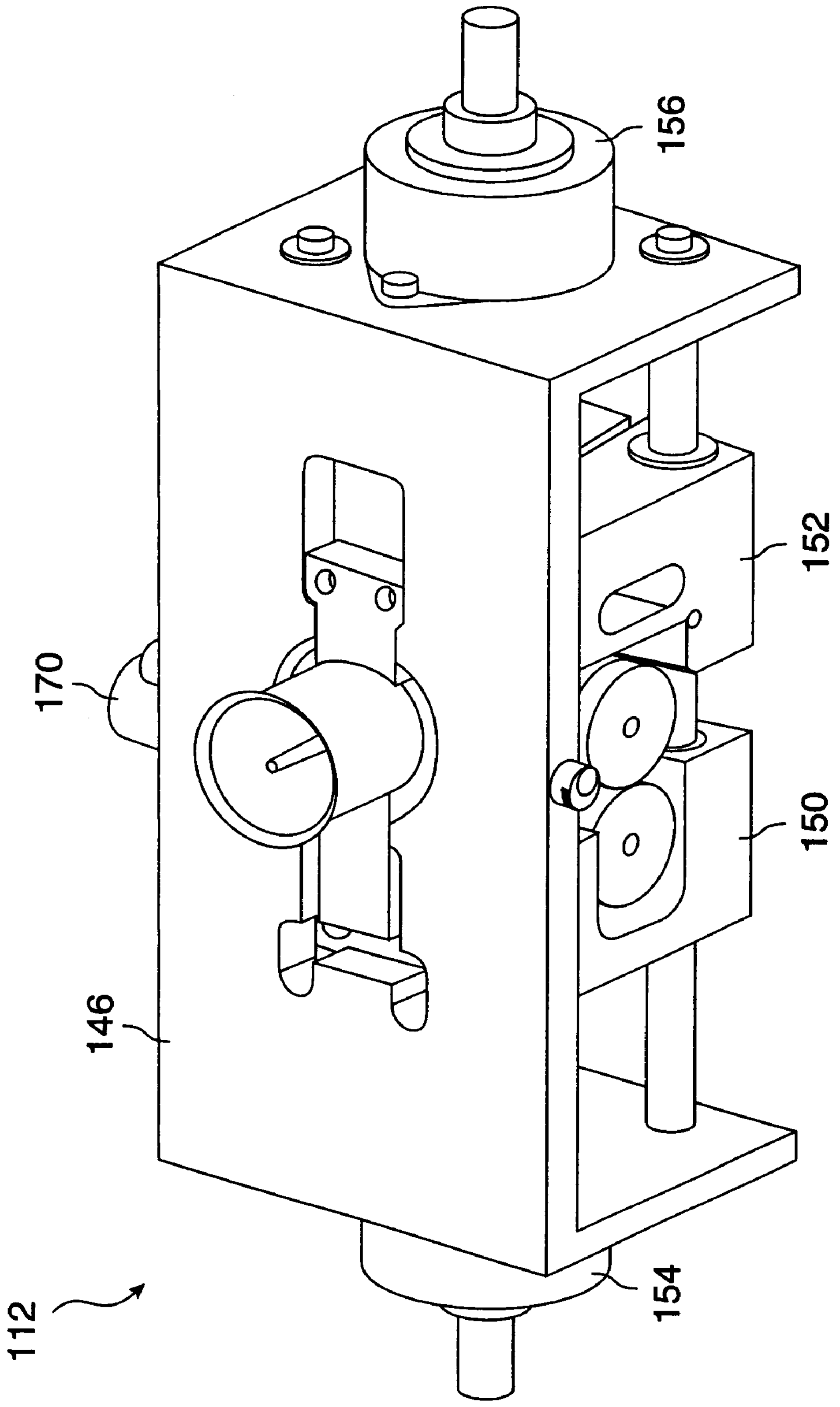
FIG. 6 is an isolated, isometric view of the sample dispensing assembly of the analytical system of FIG. 1.
Figure 7:
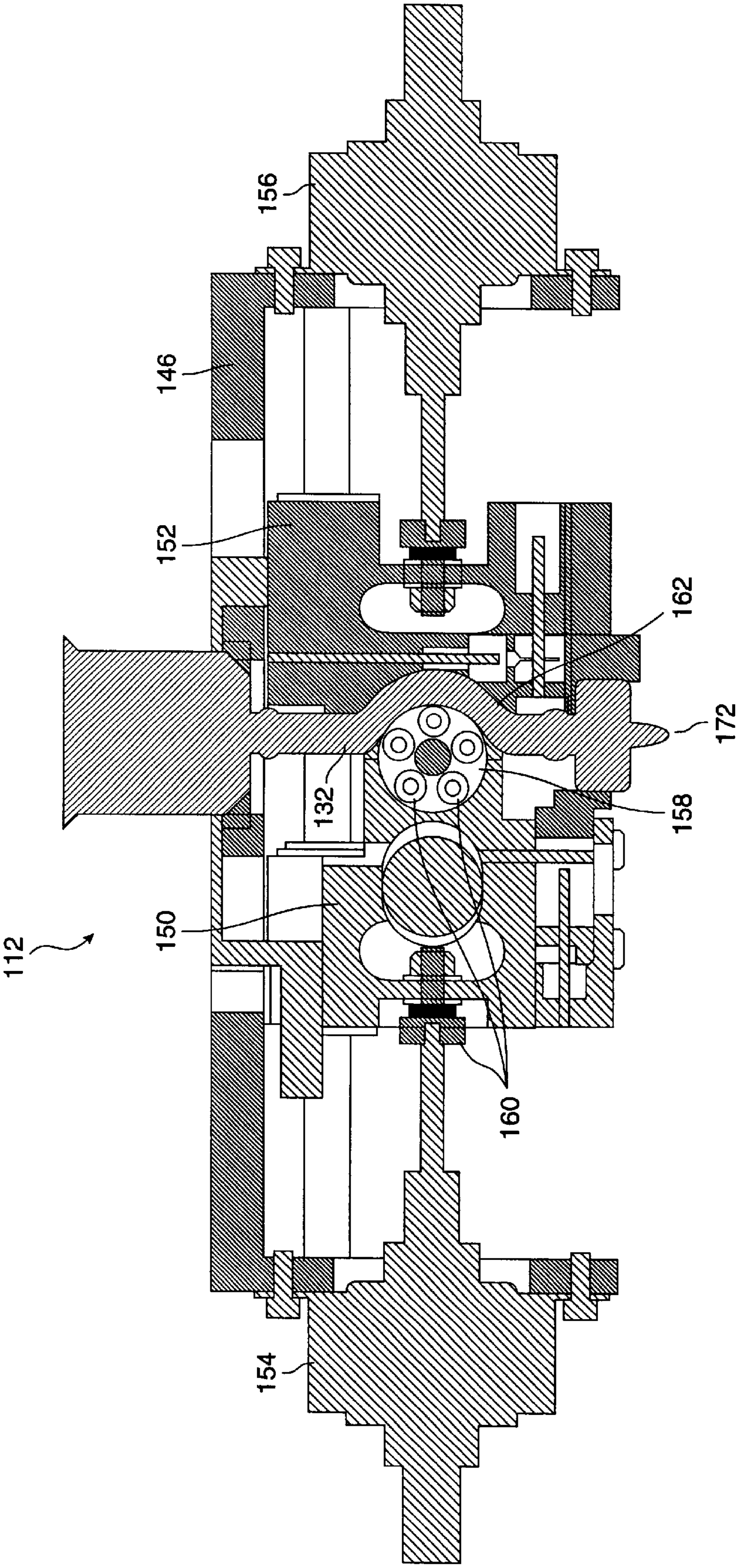
FIG. 7 is a side, cross-sectional view of the sample dispensing assembly of FIG. 6.

Referring now to FIGS. 2 and 3, an analyzer system 100 constructed in accordance with the principles of the present invention will be described. The analyzer system 100 comprises a frame 102 which will be suitable for mounting on a table top or other solid surface, a carriage 104 which is mounted on a pair of rails 106 disposed on an upper surface of the frame 102, and a fluid dispensing assembly 108 having a fluid dispensing probe 110. The probe 110 is mounted to reciprocate up and down within the assembly 108. The analyzer system 100 further includes a sample dispensing assembly 112, also mounted above the rails 106, and a fluorescent detector unit 114, also mounted above the rails 106. Usually, the analyzer will be covered by a housing (not shown) and will include a suitable I/O interface for interconnection to a motor controller 192, as described below.

Rotor 10 will be removably mountable on a vertically positionable spindle disposed on carriage 104. A vertical positioning motor 118 is mounted on the carriage 104 and connected to a motor which drives the spindle so that the motor and spindle may be raised to a desired height in order to properly position the rotor 10 relative to the fluid dispensing assembly 108, sample dispensing assembly 112, and signal detection unit 114, as will be described later in more detail. Carriage 104 will be longitudinally driven along the rails 106 by a longitudinal positioning motor 120, which threadably engages a lead screw 121. In this way, the rotor 10 can be positioned both longitudinally and vertically in order to properly relocate the rotor among the dispensing and detection assemblies of the analyzer. The carriage 104 will also carry a rotational drive motor (not illustrated) which permits precise rotational positioning of the rotor to further locate sample and reagent delivery ports, reaction zones, and the like, relative to the other assemblies of the analyzer. The rotational drive motor will also be capable of spinning the rotor at a relatively high speed(s) in order to effect fluid flow within the rotor for performing a desired analytical protocol.

A wash/diluent solution will be provided to the analyzer system 100 in a sealed receptacle (230 in FIGS. 12A–12E) which is mounted beneath the probe 110 of the fluid dispensing assembly 108. Probe 110 will be vertically positionable, typically by raising and lowering arm 122 vertically via linear slide 124. Drive motor 126 and belt drive 126A are provided for this purpose. Fluid may then be drawn into the fluid dispensing assembly 108 using a syringe (not shown) which may be attached to the probe using a flexible tube (not shown). Use of the syringe can provide quite accurate volumetric transfer of the wash/diluent solution to the rotor 10.

Referring now also to FIGS. 4–7, liquid sample, typically whole blood, will be provided to the analyzer system 100 using a receptacle 130, of the type illustrated in copending application Ser. No. 08/386,242, the full disclosure of which is incorporated herein by reference. The receptacle 130 comprises a flexible tube 132 having an internal lumen 134. A needle assembly 136 is attached at an inlet end of the tube 132 and a filter member 138 is attached at an outlet end of the tube. A shield 140 having a flange 142 at its base is disposed around the needle assembly 136, and the shield is open at its upper end 144 so that it can receive a conventional blood collection device, such as a vacuum collection device, which can be introduced over the needle assembly 136 to provide whole blood to the lumen 134 of tube 132.

A particular advantage of receptacle 130 is that whole blood will generally be contained entirely within the assembly of the vacuum collection device and the receptacle 130, and only dispensed from the receptacle upon application of a dispensing force from the sample dispensing assembly 112.

The fluid dispensing assembly 112 includes a top plate 146 mounted on vertical support plates 148 (FIG. 2). Opposed clamp members 150 and 152 are arranged to move transversely inward and outward by means of drive motors 154 and 156, respectively. The first clamp 150 carries a drive wheel 158 (FIG. 7) having a plurality of drive rollers 160 mounted thereon engaging the flexible tube 132 on the receptacle 130. The second clamp member 152 includes a semicircular recess 162 which mates with the drive wheel 158 to clamp the flexible tube therebetween. Controlled rotation of the drive wheel 158 via drive motor 170 creates a peristaltic driving force to deliver blood from the collection device mounted on needle 136 through the filter member 138 so that plasma is delivered from the delivery tip 172. Further details of the construction and operation of the sample dispensing system are described in copending application Ser. No. 08/386,242, previously incorporated herein by reference.

Figure 8:
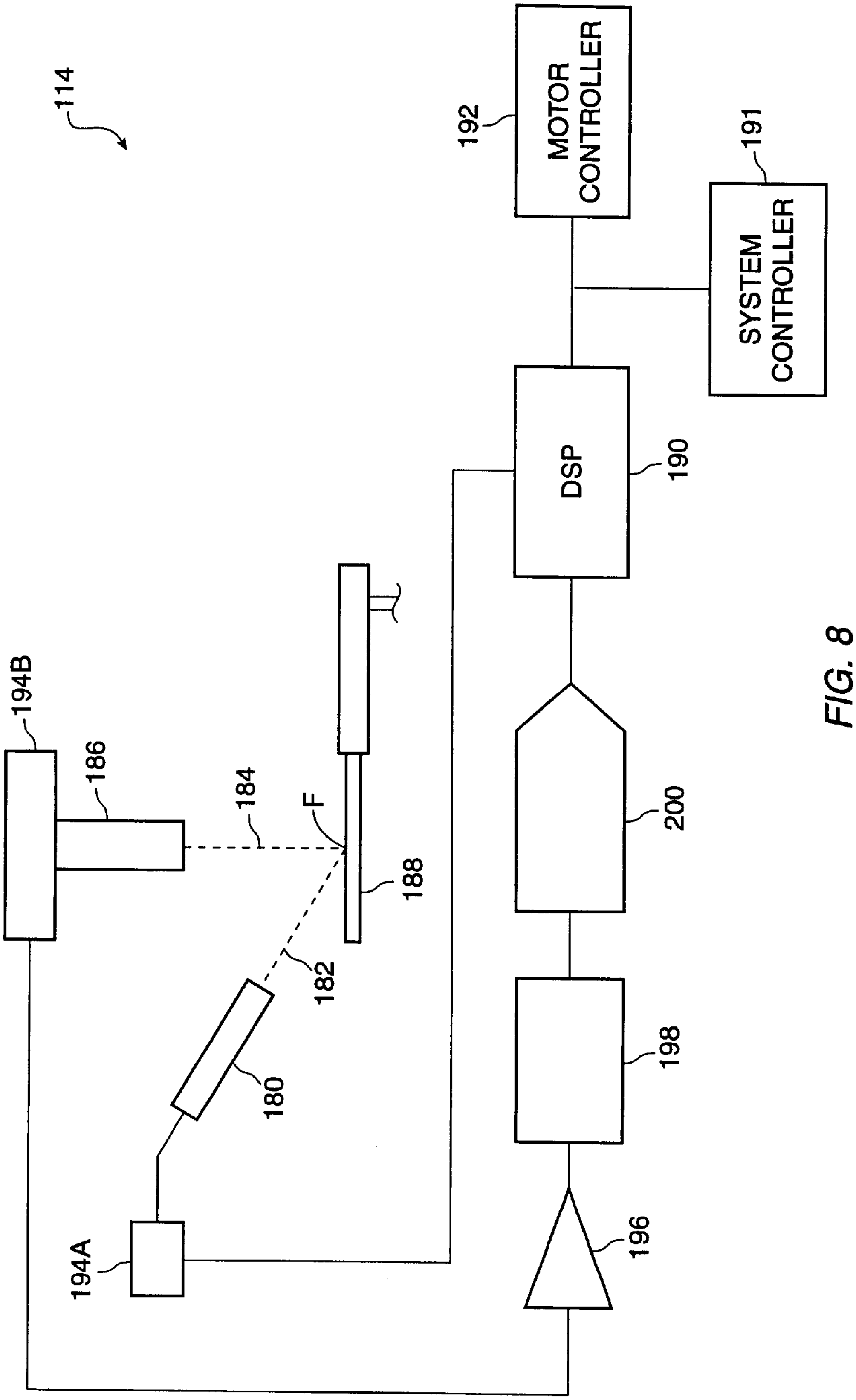
FIG. 8 is a schematic illustration of the sample detection assembly of the system of FIG. 1.

Referring now to FIG. 8, the detection unit 114 will be described in more detail. The detection unit 114 is intended specifically for the direct detection of a fluorescent label introduced to the analytical rotor 10 as a result of the assay protocol. While fluorescent and other localized signals, such as bioluminescence and chemiluminescence, are preferred for use in the system and method of the present invention, it will be appreciated that the principles of the present invention can be used with virtually any detectable signal, including radioactive labels, enzyme labels (resulting in colored reaction products which are detected spectrophotometrically), and the like. The exemplary detection unit 114 comprises a focused diode laser 180 having an in-line filter for focusing laser light at a desired excitation wavelength at a system focus point F. The system focus point F is at a fixed location within the analyzer, and in particular is located at the junction between the projection line 182 of the diode laser 180 and a detection line 184 of the fluorescent optical collection system 186. In the absence of rotor 10, a plate 188 comprising a fluorescent standard is pivotally mounted so that the focal point lies on its upper surface. The fluorescent standard is used to calibrate the system 100 periodically between successive readings of fluorescence from the reaction zones within rotors 10. Conveniently, the plate 188 will be constructed so that it pivots out of the way when the rotor is brought to the focus point F by the rotor carriage 104. Usually, the plate will incrementally rotate each time it is moved by the carriage 104 so that no one point on its surface is over-exposed to laser light.

The detection unit 114 includes a signal processing system comprising a digital signal processor 190 which is connected to motor controller 192. The detection unit 114 includes a processing system comprising a digital signal processor 190 which is connected to a controller 192. The digital signal processor 190 controls the laser via laser modulator 194A. Signal generation via laser 180 is synchronized with signal detection via detector 194B and signal processing electronics 190, 196, 198, and 200, allowing extraneous noise sources to be rejected. Typically, the modulation frequency drives the diode of laser 180 at a suitable excitation wavelength, e.g., 635 nm, and the laser beam is focused to a spot roughly 0.5 mm in diameter at the focal point F. Fluorescent light generated from the focal point F is collected by the fluorescence optical collection system 186 which includes suitable lenses, band pass filters, and apertures for focusing the fluorescence on the cathode of photomultiplier detector 194B. Typically, the fluorescent signal has a wavelength in the range from 670 to 770 nm, so a PMT with a red-sensitive cathode is used. Output signal from the PMT is fed to a transconductance preamplifier 196, filtered by band pass filter 198, converted to a digital signal by A/D converter 200, and ultimately fed back to the digital signal processor 190.

Figure 9:
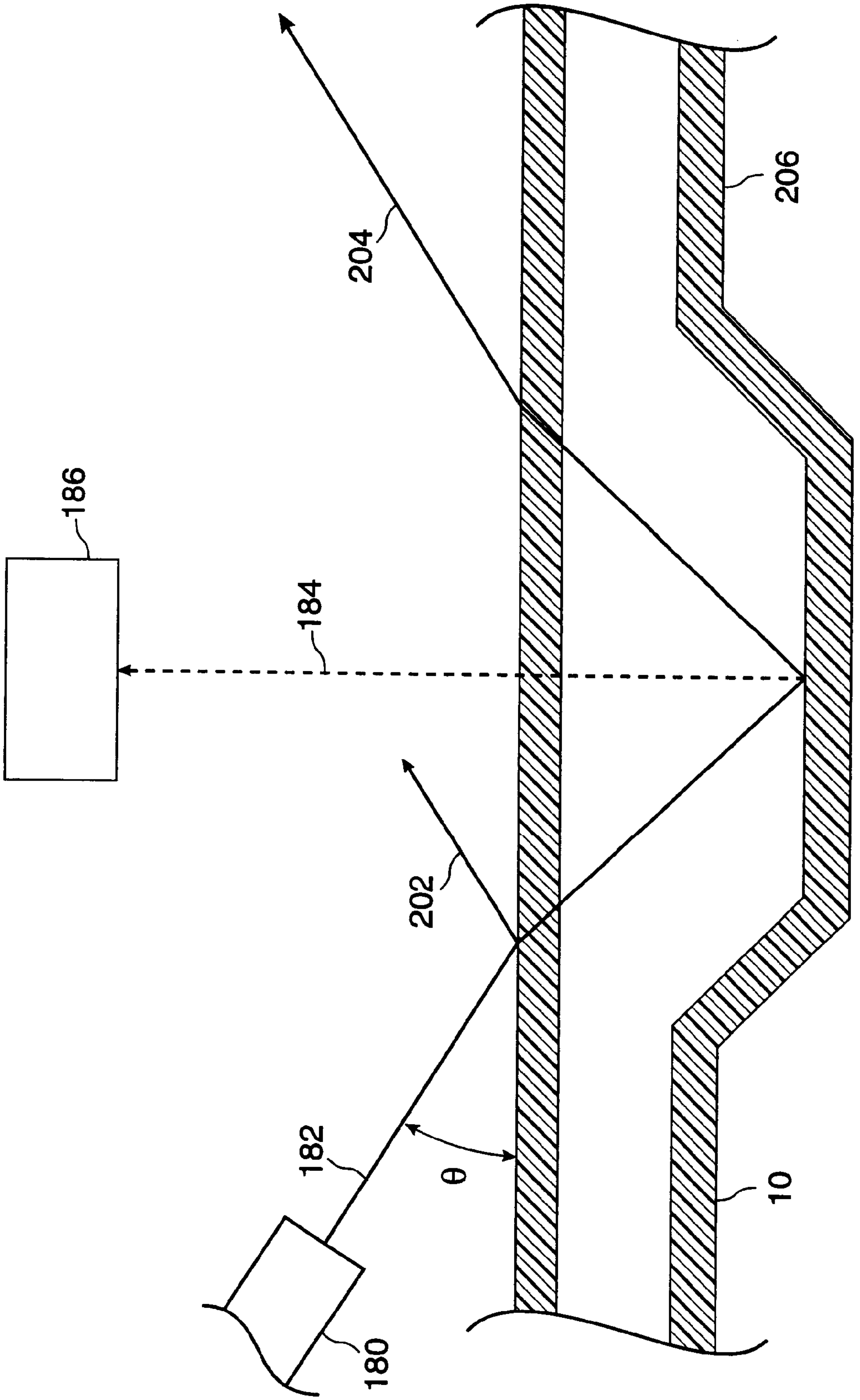
FIG. 9 is a schematic illustration of the excitation and emission paths of the fluorescent signal of the present invention within the analytical rotor.

Signal detection unit 114 is advantageous in a number of respects. The excitation beam 182 and fluorescent signal 184 to and from the rotor 10 (as illustrated in FIG. 9) are at angles selected to minimize scattered light from entering the fluorescence optical detector system 186. In particular, the angle θ at which the incident laser light beam 182 strikes the top surface of rotor 10 is selected to that the primary reflected beam 202 is not observed by the fluorescence optical detection system 186. Similarly, the secondary reflected beam 204 is not observed by the fluorescence optical detector system 186. Additionally, the detector has an aperturing system (not illustrated) which limits the field of view so that only light emanating from the focal point F (generally along line 184), is efficiently collected by fluorescence optical detector system 186. Fluorescent light generated by the top cover of the rotor is attenuated substantially by the aperture scheme. Third, a low fluorescence material is used on at least the bottom portion 206 of the rotor.

Figure 10:
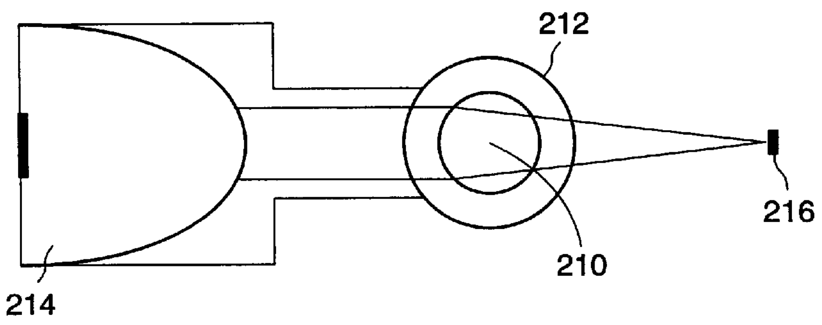
FIG. 10 is a schematic illustration of a diluent flow detection subassembly of the analytical system of FIG. 1.
Figure 12A:
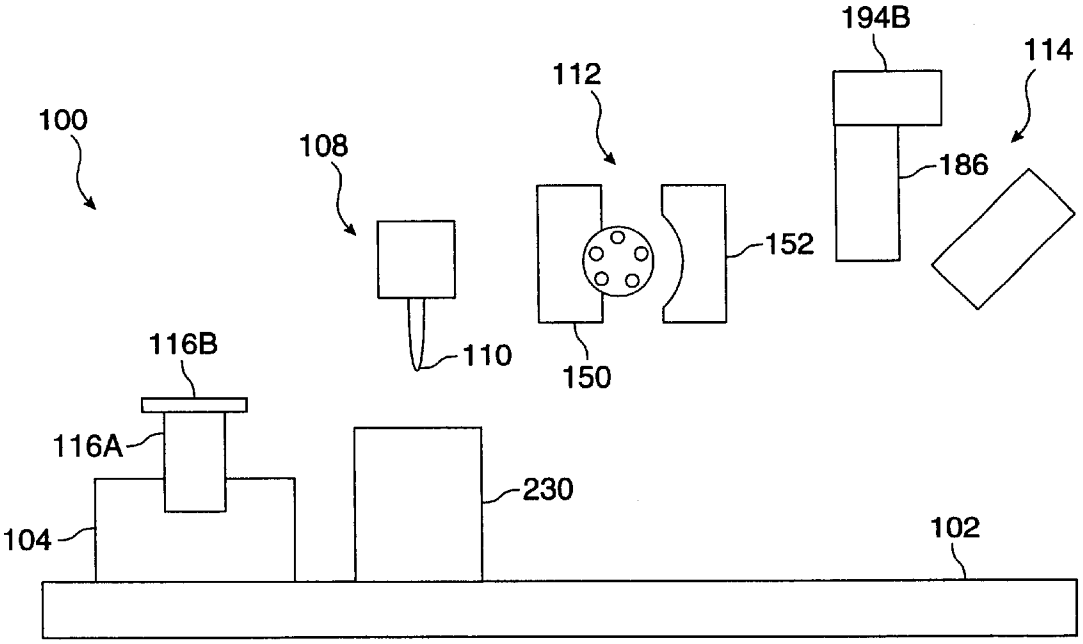
FIGS. 12A–12E are schematic illustrations of an analytical protocol utilizing a rotor according to the method of the present invention and the analytical system of FIG. 1.

Referring now to FIG. 10, bubble-free priming of probe 110 of the fluid dispensing apparatus 108 is confirmed using an "in-line" air detector. When operating properly, fluid will be drawn through lumen 210 of a tube 212 which joins the syringe (not shown) to the probe 110. When fluid is present in tube 212, the tube acts as if it were a solid material and focuses light from light source 214 onto a photodiode 216. When air bubbles are present in lumen 210, however, light from light source 214 will be diffused, and the signal level from photodiode 216 will drop, indicating that an error has occurred. Such error may occur, for example, when the wash/diluent fluid supply receptacle is empty.

Figure 11:
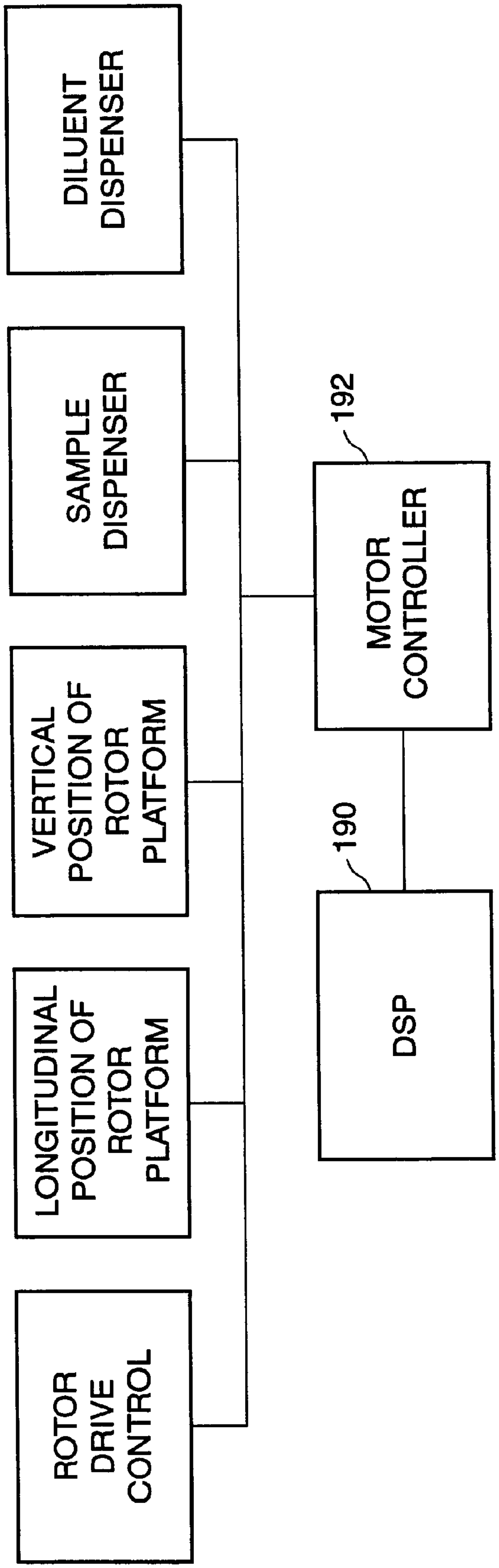
FIG. 11 is a block diagram of the control scheme of the device of the present invention.

Referring now to FIG. 11, control of the analyzer system 100 will be provided through the digital signal processor 190 and the motor controller 192, which may be provided integrally within the analyzer or may be provided as a separate unit. Motor controller 192 will receive commands from the digital signal processor 190 and control the position and rotation of rotor 10 and in particular will control the rotor drive motor (not illustrated), the longitudinal positioning motor 120, and the vertical positioning motor 118. The motor controller 192 will further control the sample dispenser 112, being interfaced with the motors 154 and 156 in order to effect clamping of flexible tube 134 and further with motor 170 for dispensing fluid via the drive wheel 158. The motor controller 192 will further be interfaced with the diluent dispenser and syringe system 108 in order to position probe 110 relative both to the wash/diluent container 230 (FIGS. 12A–12E) and the rotor 10 (when properly positioned relative to the dispensing assembly). The motor controller 192 will further be interfaced with the syringe for aspirating and delivering fluid through the probe 110.

Referring now to FIGS. 12A–12E, operation of the analyzer system 100 of the present invention for performing an exemplary assay protocol will be described in detail. Prior to running the assay, the analyzer system 100 is generally in the configuration shown schematically in FIG. 12A. No rotor is present on the carriage 104 and the clamp members 150 and 152 are spread apart and ready to receive a sample receptacle, as described below. Prior to running the assay, probe 110 will be lowered into a fluid tank 230, and the fluid dispensing assembly 108 filled with sufficient fluid to run the assay, typically from about 3 ml to 5 ml. Filling is accomplished using a syringe assembly (not shown) which provides for highly accurate dispensing of fluid from the probe 110 to the rotor, as described below. The fluid tank 230 will typically be a disposable container which remains sealed prior to use. A small opening will be provided on the top of the container to permit probe 110 to be lowered and introduced into the fluid volume for aspiration. Proper filling of the fluid dispensing assembly 108 is confirmed using the fluid flow detector assembly described above in connection with FIG. 10.

Figure 12B:
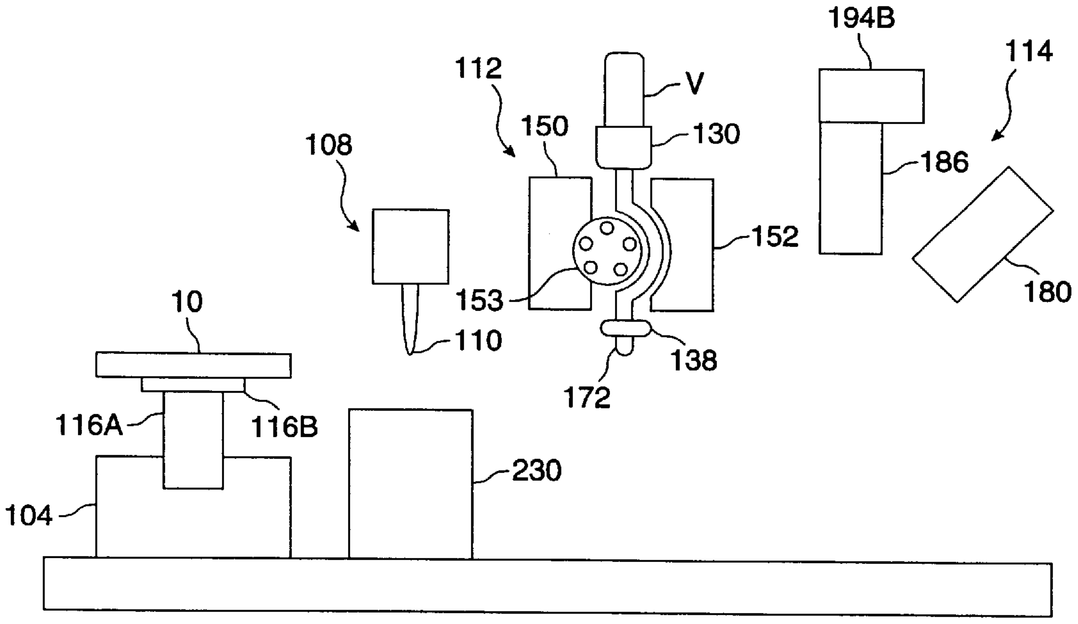

Immediately prior to any assay run, probe 110 will again be lowered into the fluid tank 230 in order to replace any fluid which may have been lost due to evaporation. Typically, the syringe will expel a small volume, typically about 200 μl, back into the fluid tank to assure that the system is free of air. The probe 110 is then raised upward to its home position, and all other motors are "homed" by the DSP 190 and the motor controller 192. In particular, the carriage 104 is moved to its home position (i.e., fully to the bottom of FIG. 2), the disc rotation motor 116A lowered in order to receive a rotor 10 (as illustrated in FIG. 12B), and the clamp members 150 and 152 are moved apart to receive the sample receptacle 130 (also illustrated in FIG. 12B). When the analyzer system 100 is ready, the system controller 191 interface will prompt the user to insert a test rotor onto the spindle of motor 116A, typically through an opening in the front of the instrument housing. The rotor 10 is received on the drive motor spindle (not shown) and held in place by magnetic chuck 116B. Once the rotor 10 is in place, the system computer interface will prompt the user to insert the sample receptacle 130 into the sample dispensing assembly 112, where the flexible tube will be clamped between clamps 150 and 152. Usually, the clamps will automatically close with a light clamping force that properly locates the dispensing tip 172 at the proper position for engaging the rotor 10 at a subsequent point in the protocol. As illustrated in FIG. 12B, a vacuum blood container V is in place within the receptacle 130. In this way, rotation of the wheel 158 will cause blood flow through the filter 138 and dispensing of plasma from the probe tip 172.

The rotor 10 is then rotationally positioned using a bar code sensor (not shown) which is incorporated in the platform 116. A bar code identification is provided on the bottom surface of rotor 10, permitting the bar code sensor to identify the type of rotor and the lot number of the rotor. The analyzer system 100 can then access information relating to the particular rotor for performing subsequent steps in the assay. The bar code sensor is also used to identify a molded feature in the bottom of rotor 10 to permit accurate rotational positioning of the rotor. It will be appreciated that the position of the molded feature can be very accurately set during the manufacturing process.

After the rotor 10 has been introduced and properly rotationally positioned on the disc rotation motor 116A, the carriage 104 is translated to the fluid dispensing assembly 108, and the rotor rotated so that a diluent or other reagent receiving port on its upper surface is positioned under probe 110. After delivery of a first volume of the diluent or other reagent, the rotor 10 may be incrementally rotated so that additional fluid delivery ports are aligned with the probe 110, which is then lowered onto the port and fluid transferred accordingly. In an exemplary embodiment, the rotor 10 will include a sample section, a high control section, and a low control section, requiring three separate fluid transfer protocols.

After an initial volume of diluent has been introduced to the sample receptacle 16 of the rotor 10, carriage 104 moves to the sample dispensing assembly 112 so that the rotor 10 is positioned beneath the dispensing tip 172. The rotor 10 is then rotated so that the dispensing tip is aligned with the fluid delivery port 22 for the sample chamber 16, and the rotor raised by motor 118 to engage the tip. Plasma is then delivered by rotating wheel 158 until the chamber 16 is filled to a precise level, as described in more detail in copending application Ser. No. 08/386,242, the full disclosure of which has previously been incorporated herein by reference. It will be appreciated that the chamber 16 is now filled with a combination of both diluent and sample in a precisely measured volumetric ratio. Sample, of course, will not be delivered to the high control and low control sections of the rotor 10. The high control and low control sections will contain lyophilized or otherwise dried reagents in the "sample" chambers. The reagents are selected for providing the desired control value.

At this point in the protocol, the sample chamber 16 of the sample section and analogous chambers of the control sections are filled with fluid. In the case of the sample chamber 16, the plasma and diluent are unmixed. In the case of the control chambers, the control solution dried to the chamber bottom is diffusing into the diluent, but is also unmixed. In order to mix the sample and control solutions prior to transfer into the corresponding reaction zones, steel mixing balls may be provided in the chambers. By providing appropriately-placed fixed magnets within the magnetic chuck 116B and platform 116, rotation of the disk at a relatively low rate will cause the mixing balls to move back and forth and provide a desired mixing action. The mixing structure and method are also described in copending application Ser. No. 08/521,615, the full disclosure of which has previously been incorporated herein by reference.

After the sample and control solutions are mixed, the rotor is rotated at a higher rotational rate, typically about 1000 rpm, for a time sufficient to transfer fluid into the corresponding reaction zone 28, typically about 3 seconds. Because of the relatively high flow resistance of outlet channel 62, very little of the transferred fluid volume will be lost from the reaction chamber 28. Additionally, air within the chamber 28 will be initially captured and subsequently held within the air capture section 50.

After the sample and control solutions are transferred to the corresponding reaction zones 28, rotor rotation will be stopped and the solutions allowed to incubate with the specific reaction zones within the chamber 28. After the analyte binding or other reaction step has been completed, the rotor is spun at a much higher rate, typically about 5000 rpm, for a time sufficient to empty the reaction chamber 28 of fluid through outlet passage 62 into the waste collection chamber 60.

Figure 12C:
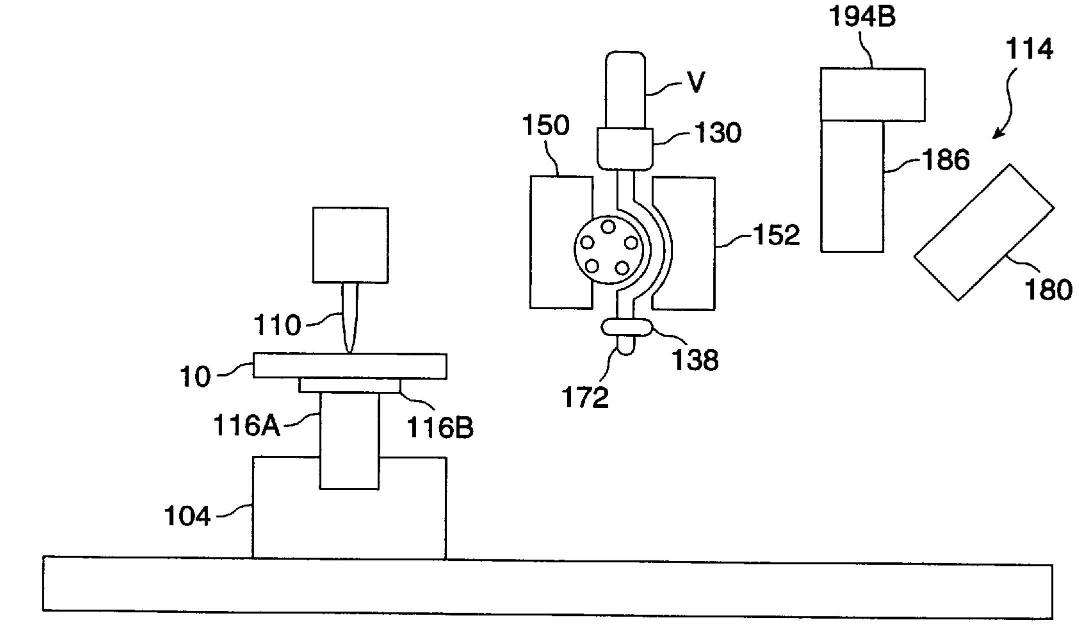
Figure 12D:
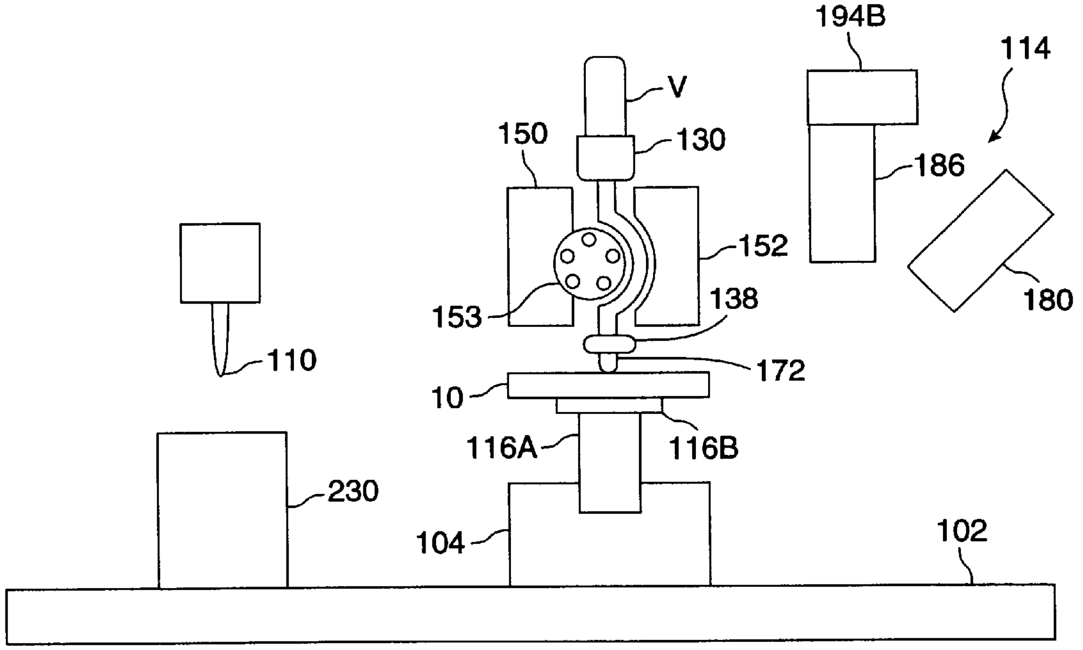
Figure 12E:
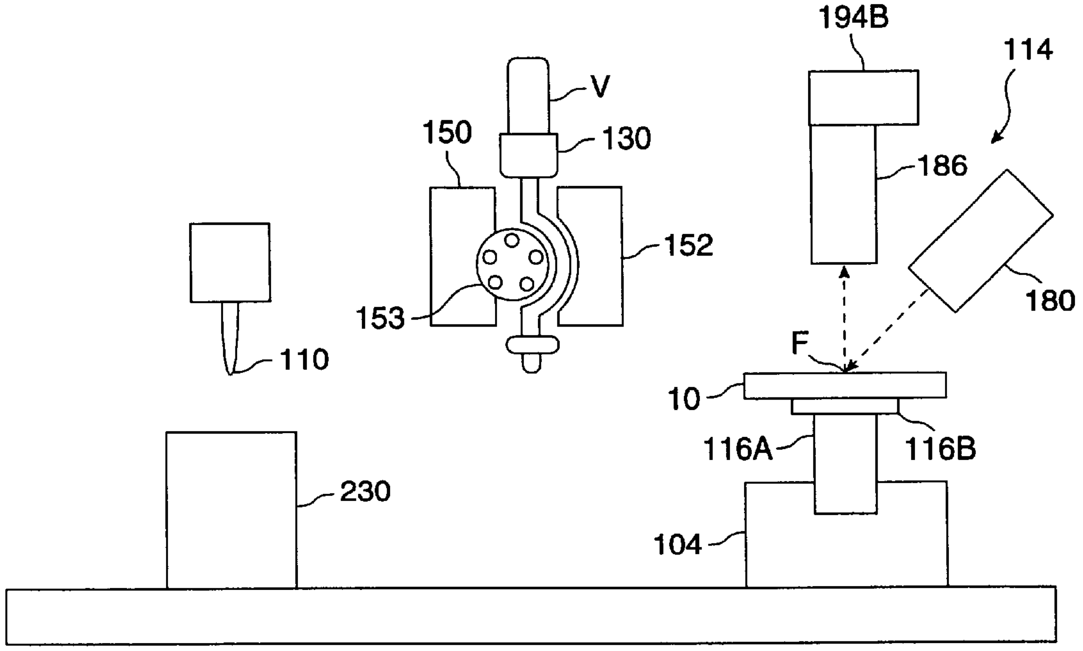

After the reaction step has been completed and the reaction chamber 28 emptied, it will usually be necessary to wash the reaction chamber one or more times with the diluent which acts as a wash solution. To do so, the carriage 104 is translated to bring the rotor 10 back to the fluid dispensing assembly 108, as illustrated in FIG. 12C. The fluid probe 110 is inserted through inlet port 24 for wash chamber 18 and a desired volume of fluid transferred, typically about 120 μl. This is done for each of the sample and control sections of the rotor 10. The rotor 10 is then rotated at a speed sufficient to transfer the wash fluid to the reaction chamber 28. After washing the chamber 28, the wash solution is expelled through the outlet 62 by rotation at a higher rotational rate. The wash cycle may be repeated one or more times in order to completely clear the reaction chamber 28 of unbound analyte.

Next, labelling reagent will be reconstituted by introducing the diluent into the labelling chamber 20 in the sample and control sections of the rotor 10. After the fluid is initially transferred, the rotor 10 is rotated at a slow speed and mixing balls in the chambers will assure solubilization and reconstitution of the labelling reagent. After sufficient solubilization, the labelling reagent is transferred to the reaction zone 28 by rotation at the intermediate rate of about 1000 rpm. The labelling reagent remains within the reaction zone 28 for a time sufficient to permit binding to the previously-captured analyte. Typically, the label will be fluorescent, permitting detection with the preferred fluorescent detector 114 as described below. The reaction chamber will again be washed with diluent introduced through wash chamber 18. It will be appreciated that during the wash and labelling cycles, the rotor 10 will be located at the fluid dispensing station 108, as illustrated in FIG. 12C.

In order to prepare the reaction zone 28 for label detection, the reaction zone will be filled with diluent. Conveniently, the diluent is introduced through the wash chamber 18 and transferred to the reaction zone 28 as described previously for the wash steps. There will, however, be no mixing and washing of the chamber. Presence of diluent within the reaction chamber 28 assures that water vapor will not accumulate on the top of the reaction chamber which can adversely affect optical readings by scattering of light.

In order to read label within the reaction zone 28, the carriage 104 is translated to the fluorescence detection unit 114 to position the reaction zone 28 at the focal point F, as previously described in connection with FIG. 8. A particular advantage of using a fluorescent or other directly observable labels, such as chemiluminescent and bioluminescent labels, is that the individual reaction zones within the reaction chamber 28 may be separately interrogated (excited and detected). This allows the assay protocol to be run simultaneously for different analytes and different reaction zones, with the only separate steps required being during the detection phase. Thus, each reaction zone within the reaction chamber 28 is sequentially read by directing focused laser excitation light from source 180 at the reaction zone and detecting the emitted fluorescence using fluorescence optical collection system 186 and photomultiplier detector 194B. The system will be periodically calibrated, also as described in connection with FIG. 8 above.

The analyzer system 100 and method of the present invention as described above may be utilized with virtually any analyte and any type of sample which is liquid or may be liquified. The system and method will find particular use with panels of analytes which are advantageously measured simultaneously and from a single sample, such as cardiac markers detected in blood samples from patients suspected of suffering from myocardial infarction. Such cardiac markers include total creatine kinase (CK), CK isoenzymes, CK isoforms, myosin light chain, myoglobin, and the like.

Although the foregoing invention has been described in some detail by way of illustration and example, for purposes of clarity of understanding, it will be obvious that certain changes and modifications may be practiced within the scope of the appended claims.

What is claimed is:

1. A system for performing assays employing a disposable sample receptacle and a disposable rotor, said system comprising:

a frame having longitudinal, transverse, and vertical axes;

a rotational drive unit for removably receiving and selectively rotating the rotor including a non-rotating rotor support having a plurality of fixed magnets therein for agitating magnetically responsive mixing elements to effect mixing in the rotor as the rotor is rotated;

a positioning assembly on the frame which translates the rotational drive unit along a predetermined linear path within the system;

a liquid reagent dispenser disposed along the predetermined path;

a sample dispensing unit disposed along the predetermined path, wherein the sample dispensing unit removably receives the sample receptacle and includes a drive mechanism for dispensing liquid sample from the sample receptacle to a rotor;

a signal detector disposed along the predetermined path of the rotational drive unit; and a controller operatively connected to the rotational drive unit, the positioning assembly, the liquid reagent dispenser, the sample dispensing unit, and the detector, wherein the controller controls (a) the positioning assembly to translate the rotational drive unit among the liquid reagent dispenser, the sample dispensing unit, and the detector, (b) the rotational drive unit to rotate the rotor, (c) the liquid reagent dispenser to dispense liquid reagent to the rotor, (d) the sample dispensing unit to dispense sample to the rotor, and (e) the signal detector to detect signal produced in the rotor.

2. The system as in claim 1, wherein the linear path is oriented longitudinally.

3. The system as in claim 1, wherein the rotational drive unit includes a drive motor which can be controlled to operate at at least two rotational speeds and to selectively position a rotor at stationary rotational positions.

4. The system as in claim 3 wherein the motor is servo-controlled.

5. The system as in claim 1, wherein the rotational drive unit includes a magnetic chuck for receiving the rotor.

6. The system as in claim 1, wherein the positioning assembly can also translate the rotational drive unit along a vertical axis, whereby the drive unit can be positioned in a plane defined by the longitudinal and vertical axes.

7. The system as in claim 6, wherein the positioning assembly comprises longitudinal guide tracks on the frame, a carriage slidably mounted on the longitudinal tracks, a motor connected to the controller for positioning the carriage along the longitudinal guide, a disc rotation motor and spindle on the carriage for receiving a rotor, and a vertical positioning motor mounted on the carriage and connected to the disc rotation motor for positioning the motor and spindle along a vertical axis relative to the carriage.

8. The system as in claim 1, wherein the liquid reagent dispenser includes a dispensing probe, a syringe connected to the controller for aspirating and dispensing liquid reagent through the probe, and a receptacle on the frame for removably receiving a disposable reagent container.

9. The system as in claim 8, wherein the liquid reagent dispenser further includes a vertical guide on the frame and a motor connected to the controller for positioning the probe along said vertical guide.

10. A system for performing assays employing a disposable sample receptacle and a disposable rotor, said system comprising:

a frame having longitudinal, transverse, and vertical axes;

a rotational drive unit including a magnetic chuck for removably receiving and selectively rotating the rotor;

a positioning assembly on the frame which translates the rotational drive unit along a predetermined path within the system longitudinally;

a liquid reagent dispenser disposed along the predetermined path;

a sample dispensing unit disposed along the predetermined path, wherein the sample dispensing unit removably receives the sample receptacle and includes a drive mechanism for dispensing liquid sample from the sample receptacle to the rotor;

a single detector disposed along the predetermined path of the rotational drive unit; and a controller operatively connected to the rotational drive unit, the positioning assembly, the liquid reagent dispenser, the sample dispensing unit, and the detector, wherein the controller controls (a) the positioning assembly to translate the rotational drive unit among the liquid reagent dispenser, the sample dispensing unit, and the detector, (b) the rotational drive unit to rotate the rotor, (c) the liquid reagent dispenser to dispense liquid reagent to the rotor, (d) the sample dispensing unit to dispense sample to the rotor, and (e) the signal detector to detect signal produced in the rotor.

11. The system as in claim 10, wherein the positioning assembly translates the rotational drive unit along a linear path on the frame.

12. The system as in claim 11 wherein the linear path is oriented longitudinally.

13. The system as in claim 25, wherein the rotational drive unit includes a drive motor which can be controlled to operate at least two rotational speeds and to selectively position a rotor at stationary rotational positions.

14. The system as in claim 13, wherein the motor is servo-controlled.

15. The system as in claim 10, wherein the rotational drive unit includes a non-rotating rotor support having a plurality of fixed magnets therein for interacting with magnetically responsive mixing elements in the rotor as the rotor is rotated.

16. The system as in claim 10, wherein the positioning assembly can also translate the rotational drive unit along a vertical axis, whereby the drive unit can be positioned in a plane defined by the longitudinal and vertical axes.

17. The system as in claim 16, wherein the positioning assembly comprises longitudinal guide tracks on the frame, a carriage slidably mounted on the longitudinal tracks, a motor connected to the controller for positioning the carriage along the longitudinal guide, a disc rotation motor and spindle on the carriage for receiving a rotor, and a vertical positioning motor mounted on the carriage and connected to the disc rotation motor for positioning the motor and spindle along a vertical axis relative to the carriage.

18. The system as in claim 10, wherein the liquid reagent dispenser includes a dispensing probe, a syringe connected to the controller for aspirating and dispensing liquid reagent through the probe, and a receptacle on the frame for removably receiving a disposable reagent container.

19. The system as in claim 18, wherein the liquid reagent dispenser further includes a vertical guide on the frame and a motor connected to the controller for positioning the probe along said vertical guide.

20. A system for performing assays employing a disposable sample receptacle and a disposable rotor, said system comprising:

a frame having longitudinal, transverse, and vertical axes;

a rotational drive unit having a magnetic chuck for removably receiving and selectively rotating the rotor;

a positioning assembly on the frame which translates the rotational drive unit along a predetermined path within the system longitudinally, a liquid reagent dispenser disposed along the predetermined path;

a sample dispensing unit disposed along the predetermined path, wherein the sample dispensing unit removably receives the sample receptacle and includes a drive mechanism for dispensing liquid sample from the sample receptacle to a rotor;

a signal detector disposed along the predetermined path of the rotational drive unit; and a controller operatively connected to the rotational drive unit, the positioning assembly, the liquid reagent dispenser, the sample dispensing unit, and the detector, wherein the controller controls (a) the positioning assembly to translate the rotational drive unit among the liquid reagent dispenser, the sample dispensing unit, and the detector, (b) the rotational drive unit to rotate the rotor, (c) the liquid reagent dispenser to dispense liquid reagent to the rotor, (d) the sample dispensing unit to dispense sample to the rotor, and (e) the signal detector to detect signal produced in the rotor.

21. The system as in claim 20, wherein the positioning assembly translates the rotational drive unit along a linear path.

22. The system as in claim 21, wherein the linear path is oriented longitudinally.

23. The system as in claim 20, wherein the motor is servo-controlled.

24. The system as in claim 20, wherein the rotational drive unit includes a non-rotating rotor support having a plurality of fixed magnets therein for interacting with magnetically responsive mixing elements in the rotor as the rotor is rotated.

25. The system as in claim 20, wherein the positioning assembly can also translate the rotational drive unit along a vertical axis, whereby the drive unit can be positioned in a plane defined by the longitudinal and vertical axes.

26. The system as in claim 25, wherein the positioning assembly comprises longitudinal guide tracks on the frame, a carriage slidably mounted on the longitudinal tracks, a motor connected to the controller for positioning the carriage along the longitudinal guide, a disc rotation motor and spindle on the carriage for receiving a rotor, and a vertical positioning motor mounted on the carriage and connected to the disc rotation motor for positioning the motor and spindle along a vertical axis relative to the carriage.

27. The system as in claim 20, wherein the liquid reagent dispenser includes a dispensing probe, a syringe connected to the controller for aspirating and dispensing liquid reagent through the probe, and a receptacle on the frame for removably receiving a disposable reagent container.

28. The system as in claim 27, wherein the liquid reagent dispenser further includes a vertical guide on the frame and a motor connected to the controller for positioning the probe along said vertical guide.

29. The system as in claim 20, wherein the sample dispensing unit includes:

a clamp structure for removably securing a flexible tube having an inlet end and an outlet end, which tube is part of the disposable sample receptacle; and a peristaltic drive wheel which engages the flexible tube when the sample receptacle is secured in the clamp structure, wherein rotation of the drive wheel causes sample to flow from the inlet end to the outlet end of the flexible tube.

30. The system as in claim 29, wherein the sample dispensing unit further comprises a collar for supporting the inlet end of the flexible tube.

31. The system as in claim 20, wherein the sample dispensing unit further comprises one or more rods which extend transversely from the collar, wherein the clamp structure comprises first and second opposed clamping elements at least one of which is translatably mounted on the rods, and wherein the sample dispensing unit further comprises at least one motor for translating one or both of the clamp elements to selectively secure and release the flexible tube when in place in the collar.

32. The system as in claim 29, wherein the drive wheel is mounted on one of the clamping elements and the other clamping element has an arcuate surface which is aligned with the drive wheel, wherein the flexible tube is captured between the drive wheel and the arcuate surface.

33. The system as in claim 32, herein the drive wheel comprises a plurality of peripherally spaced-apart rollers.

34. The system as in claim 20, wherein the signal detector includes a light source and an emitted light detector, wherein the light source is positioned to focus light within the preselected fluorescent excitation wavelength band at a focal point and wherein the emitted light detector is positioned to receive emitted fluorescence from a reaction zone while said zone is positioned at the focal point and receiving focused excitation light.

* * * * *